E. OLIVER.
TEA-POT.
No. 187,893. Patented Feb. 27, 1877.
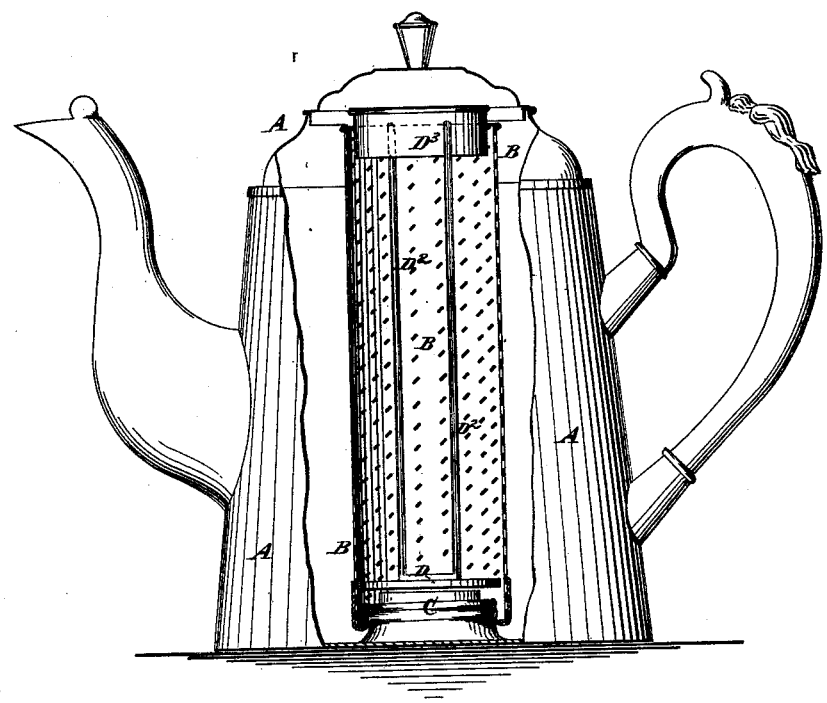
WITNESSES:
A. W. Almquist
Alex F. Roberts
INVENTOR:
E. Oliver
BY
Munn
ATTORNEYS.

UNITED STATES PATENT OFFICE.

EBENEZER OLIVER, OF NEW YORK, N. Y.

IMPROVEMENT IN TEA-POTS.

Specification forming part of Letters Patent No. 187,893, dated February 27, 1877; application filed January 19, 1877.

*To all whom it may concern:*

Be it known that I, EBENEZER OLIVER, of the city, county, and State of New York, have invented a new and useful Improvement in Tea-Pots, of which the following is a specification:

The figure is a side view of a tea-pot to which my improvement has been applied, part being broken away to show the construction.

This invention is an improvement in the class of tea-pots which are provided with a removable perforated or wire-gauze holder or receptacle for tea-leaves.

The improvement relates to the construction of parts, whereby the tea holder or receptacle is attached to the bottom of the pot; and, also, to the combination, with said holder or receptacle, of the device employed for removing the tea-leaves subsequent to the steeping operation, all as hereinafter fully described.

Referring to the drawing, A indicates a tea-pot of ordinary construction, except that it is provided with the circular screw-threaded projection or plug C, which forms a permanent attachment of the bottom thereof. (In place of this projection I may employ a fixed ring-socket having an internal screw-thread.) B is the perforated tea holder or receptacle, which is cylindrical in form, open at each end, and provided with a screw-thread at the bottom, to adapt it to be screwed on the projection C, and be thereby secured in the pot A.

The disk D, wires $D^2$, and ring $D^3$ constitute the device, which forms the second feature of my invention. The disk D is the false bottom of holder B, and the tea-leaves are deposited on the same when tea is to be decocted.

When it is desired to remove the spent tea-leaves from the holder B it is only necessary to withdraw the device D $D^2$ $D^3$ from the latter. Said device may then be replaced, and the pot will be ready for renewed use.

The disk D fits closely in the holder B, and the ring $D^3$ is concentric with it, thus serving to keep the disk D in proper position to prevent escape of tea-leaves, and to remove them from the cylinder when required.

When the holder B requires to be cleaned, it may be readily screwed off from the projection C, and removed from the pot, together with the device D $D^2$ $D^3$. When placed in the pot, as shown, the lid or cover of the pot A forms also the cover of the holder B.

I do not claim, broadly, a tea-holder having a detachable connection with the bottom of a tea-pot; but What I do claim is—

1. In combination with the pot A, having the fixed screw-threaded projection C, the holder B, provided with a corresponding screw-thread, whereby it is adapted to be screwed on said projection, as shown and described.

2. In combination with the perforated open-ended holder B, the disk or false bottom D, wires $D^2$, and ring $D^3$, forming the device for withdrawing the spent tea-leaves from said holder, as shown and described.

EBENEZER OLIVER.

Witnesses:
 JAMES T. GRAHAM,
 C. SEDGWICK.